(12) United States Patent  (10) Patent No.: US 7,743,983 B1
Harkins  (45) Date of Patent: Jun. 29, 2010

(54) METHOD AND APPARATUS FOR LOCATING ELECTRONIC SHELF LABELS

(75) Inventor: Cheryl Kay Harkins, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 959 days.

(21) Appl. No.: 11/284,592

(22) Filed: Nov. 22, 2005

(51) Int. Cl.
*G06K 15/00* (2006.01)

(52) U.S. Cl. .................................. 235/383; 705/20
(58) Field of Classification Search ............... 235/383; 705/20, 22
See application file for complete search history.

(56) References Cited

U.S. PATENT DOCUMENTS

| | | | |
|---|---|---|---|
| 5,704,049 A * | 12/1997 | Briechle | 715/744 |
| 5,812,985 A * | 9/1998 | Failing et al. | 705/5 |
| 5,818,346 A | 10/1998 | Goodwin, III et al. | |
| 6,011,487 A | 1/2000 | Plocher | |
| 6,236,335 B1 | 5/2001 | Goodwin, III | |
| 6,662,165 B1 * | 12/2003 | Saliceti et al. | 705/20 |
| 6,724,318 B2 | 4/2004 | Goodwin, III et al. | |
| 6,885,287 B2 * | 4/2005 | Haulk et al. | 340/5.91 |
| 7,340,412 B2 * | 3/2008 | Haulk et al. | 705/20 |

* cited by examiner

*Primary Examiner*—Thien M Le
(74) *Attorney, Agent, or Firm*—Priest & Goldstein PLLC; Harden E. Stevens, III

(57) ABSTRACT

Systems and techniques for locating designated electronic shelf labels. A locator device transmits commands to a designated label, causing a label to take on distinctive characteristics, for example showing a characteristic display. Alternatively or in addition, the locator device detects transmissions from labels within range and provides an indication, such as an audible tone or a serial number display, when an identified label is within range. A user may enter a serial number of one or more labels using a keypad, or may upload one or more serial numbers to the locator device. The user then moves with the locator device around a location where labels are in use. Depending on the design of the device, the device broadcasts commands to labels to cause the labels to take on identifiable characteristics, detects serial numbers of labels based on transmissions from labels within range, or both.

21 Claims, 4 Drawing Sheets

FIG. 1
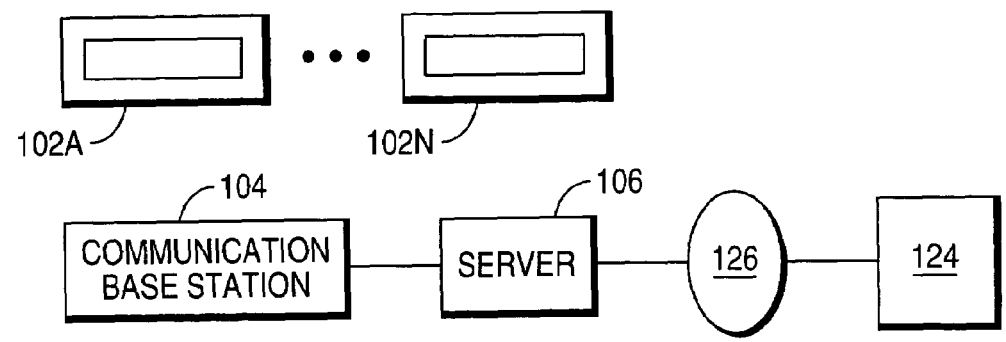
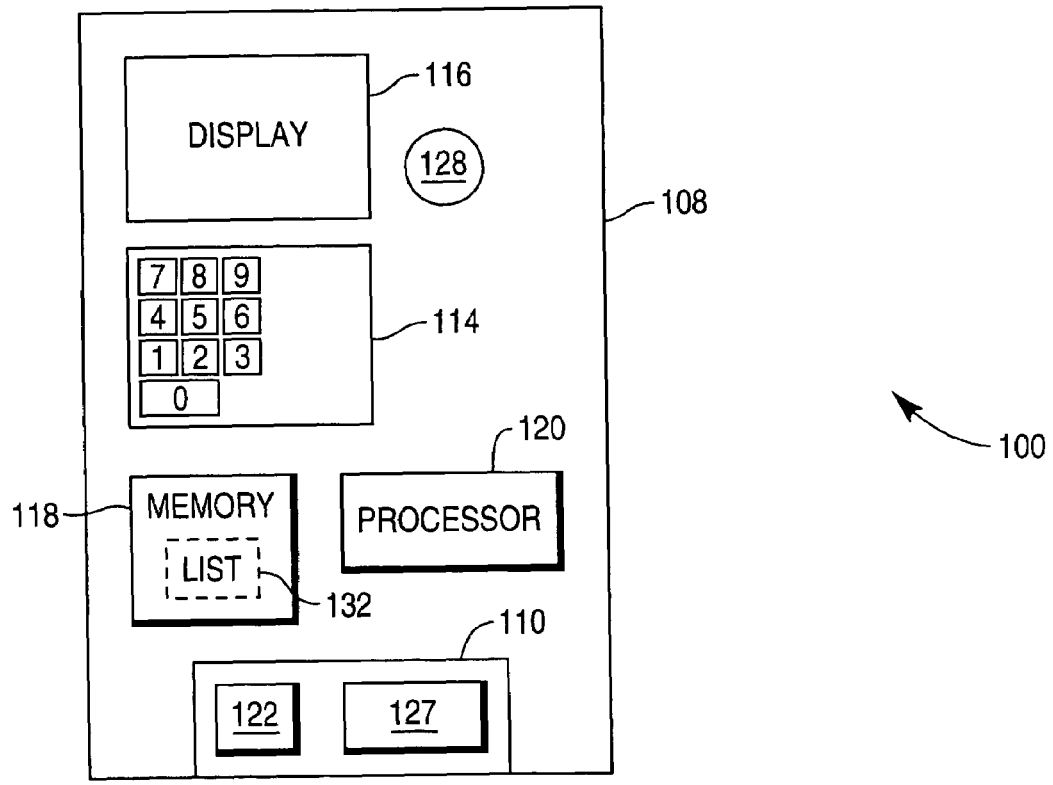

METHOD AND APPARATUS FOR LOCATING ELECTRONIC SHELF LABELS

FIELD OF THE INVENTION

The present invention relates generally to improvements to systems using electronic shelf labels for display of pricing and other desired information for goods. More particularly, the invention relates to improved systems and techniques for locating specified electronic price labels.

BACKGROUND OF THE INVENTION

Electronic shelf labels provide a convenient way to display prices and other relevant information about goods. A retail location may have hundreds or thousands of electronic shelf labels that receive pricing and other information transmitted by one or more communication base stations, which format and transmit messages to the labels based on requests by a central server, and which receive messages from the labels and relay the messages to the central server. The messages transmitted to the labels may include, for example, data for storage and display, commands and requests for status and messages transmitted by the labels may include, for example, responses to queries and status reports.

In a typical system, messages are periodically transmitted to the labels in order to check the status and contents of the labels. For example, a message may be transmitted to each label requesting an indication of the information stored in the label, and each label's response may be compared to previously stored expected information for the label. Reports may be prepared showing lists of labels showing incorrect status, such as discrepancies in stored information, improper responses to queries, or other indications of improper status. Reports typically list labels by serial number.

Once a report has been prepared, it is often desired to inspect each label listed in the report or to remove the label for testing or replacement. However, labels are numerous and similar in appearance, so that with prior art installations, it may be difficult to identify a particular label.

SUMMARY OF THE INVENTION

According to one embodiment, the present invention addresses such difficulties by providing for a handheld device that transmits commands to labels by serial number, causing the label to take on distinctive characteristics, for example, showing a characteristic display or emitting a sound. A handheld device according to another aspect of the present invention detects transmissions from labels within range and provides an indication, such as an audible tone or a serial number display, when an identified label is within range. A user may enter a serial number of one or more labels using a keypad, or may upload one or more serial numbers to the device. The user then moves around a location where labels are in use. Depending on the design of the device, the device broadcasts commands to labels to cause the labels to take on identifiable characteristics, detects serial numbers or other identifying information from labels based on transmissions from labels within range, or both. In addition a handheld device may receive identifying information based on transmissions from labels within range based on a general broadcast to labels issued from a central station and addressed to only selected labels. The selected labels will transmit identifying information and the handheld device will receive the identifying information when within range of labels transmitting such information.

A more complete understanding of the present invention, as well as further features and advantages of the invention, will be apparent from the following Detailed Description and the accompanying drawings.

BRIEF DESCRIPTION OF THE DRAWINGS

FIG. 1 illustrates an electronic shelf label system according to an aspect of the present invention;

DETAILED DESCRIPTION

Figure 2:
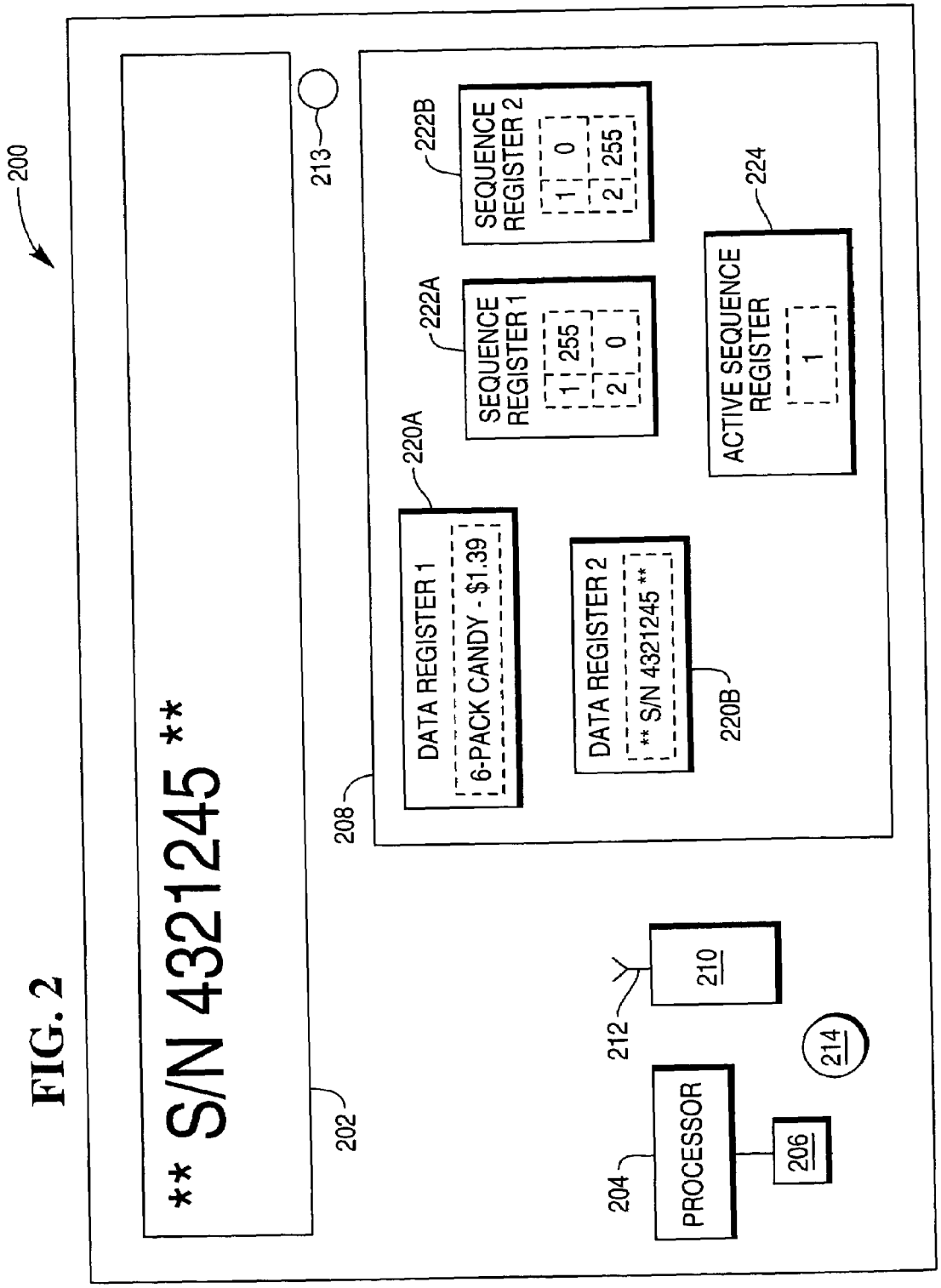
FIG. 2 illustrates an electronic shelf label according to an aspect of the present invention.

FIG. 1 illustrates an electronic shelf label system 100, including a plurality of labels 102A ... 102N. The system 100 also includes a communication base station (CBS) 104 for wirelessly transmitting data and commands to and receiving information and responses from the labels 102A ... 102N and a server 106. The server 106 manages operation of the labels 102A ... 102N, prepares information to be displayed by the labels 102A ... 102N and manages operation of the communication base station 104 as it is used to communicate with the labels 102A ... 102N. Only one communication base station 104 and one server 106 are illustrated here, but a typical installation may have thousands of labels such as the labels 102A ... 102N and several communication base stations such as the communication base station 104. Each communication base station being assigned to a specified group of labels, or alternatively, each communication base station may be able to communicate with all labels. The teachings of the present invention may easily be adapted to systems including any number of labels, communication base stations and servers.

The system 100 also includes a label locator 108. The locator 108 includes a communication interface 110, a keypad 114, a display 116, memory 118 and a processor 120. The communication interface 110 may also include an interface port 122 for communicating with the server 106, a terminal 124 connected to the server 106 through a network 126, or another device utilized for communicating desired data and commands to the locator 108. Such communication adds convenience in downloading and uploading significant quantities of data, for example lists of serial numbers of labels to be located, to and from the locator 108. Such communication also conveniently provides for providing easy notification to a remote server that a specified label has been located. However, it will be recognized that communication with a remote server such as the server 106 is not required, and that the locator 108 may be used independently of any remote data processing device, for example by manually entering serial numbers of labels to be located and manually noting when a designated label has been found.

The communication interface 110 also includes a wireless communication unit 127 to allow the locator 108 to carry on wireless communication with the labels 102A ... 102N. The wireless communication unit 127 may also be adapted and used to allow wireless communication with a server 106, if desired.

The communication interface 110 may be used to upload information such as serial numbers of labels to be located, commands to be transmitted to labels and other information useful in locating desired labels. The interface 110 may also be used to download identifying information for labels that have been located. For example, if a label is detected, a user may note the detection by entering the serial number of the detected label or selecting the serial number from a displayed list. A list of serial numbers of detected labels may be stored in the memory 118 and uploaded or wirelessly transmitted to the server 106 at convenient times.

When it is desired to locate one or more labels, the serial numbers of the labels to be located are loaded into the memory 118. A need to locate labels may arise, for example, from a bedcheck exceptions report. In a bedcheck, labels are interrogated in order to determine what information is stored in the labels. The responses to the interrogations are matched against information identifying expected stored information for each label. If a discrepancy is identified between the information provided by a label and the expected information for the label, the serial number of the label is included in a bedcheck report. Another possibility leading to a need to locate a label would be the appearance of the label on an update exceptions report, identifying labels that failed to return a response, or returned an improper response, to an attempt to update the information stored by the label. These events are exemplary and it will be recognized that numerous other events may give rise to a need to locate a label.

When a report listing labels is generated, a printed report may be issued and given to a user. The user enters a serial number of a desired label using the keypad 114 of the locator, or selects a serial number from a list or menu or the like and walks around the environment where the labels are deployed. For example, a user may walk up and down the aisles of a supermarket with the locator 108. The locator 108 issues a command to the specified label to display a specified message. For example, the locator 108 may command the label to display the label's serial number, accompanied by a blinking icon. Alternatively or in addition, the locator 108 transmits a query to the specified label, requesting a response from the label. When the response is received, the locator 108 provides an indication that the label is in the vicinity, for example by displaying an appropriate message or sounding a tone using a speaker 128.

Entering the serial number manually is suitable if only a few labels are to be located, but more tedious if a large number of labels are to be located. Therefore, the port 122 may be used to connect the locator 108 to the server 106 or any suitably equipped terminal communicating with the server 106. A list 132 of serial numbers, for example the serial numbers reported in a bedcheck exceptions report, may be downloaded to the locator 108 and stored in the memory 118. The user then carries the locator 108 around the location in which the labels are in use, and the locator 108 successively sends appropriate commands to the labels on the list. As each label is found, the user is able to identify the label, for example by entering the label's serial number using the keypad 114. Alternatively, the locator 108 may present a list of labels that are to be searched for and the user may scroll through the list and mark off labels that have been found. The locator 108 may remove the marked labels from the list of labels to be found, or alternatively may create a new list of labels that have been found. Once the search has been completed, the locator 108 may be connected to the server 106 or to a terminal such as the terminal 124 and upload serial numbers that have been found.

FIG. 2 illustrates additional details of a label 200 suitable for use as one of the labels 102A, . . . , 102N in a system such as the system 100 of FIG. 1. The label 200 includes a display screen 202, a processor 204, a clock 206, a memory 208, a communication interface 210 and an antenna 212. The label 200 may include a pushbutton 213 for selecting display options, paging through successive display screens or otherwise accepting and acting on user inputs. The label 200 may include an internal power source such as a battery 214.

The memory 208 may suitably be organized to include a plurality of registers, with registers falling into one of several different categories. A first category of registers stores information for display and use and a second category of registers stores information and commands used to control the operation of the label 200. Available information and commands include instructions needed to provide a locator signal response upon detection of a locator signal addressed to the label 200. The locator signal response may include displaying a locator message, displaying an icon, sounding a tone, transmitting the label's own locator response signal indicating that the label has received a locator signal, or any other suitable response to detection of a locator signal.

The first category of registers store various elements of information for display and use, and may conveniently be referred to as data registers. In the present exemplary embodiment, the register 220A stores price information and the register 220B stores a locator message, with the locator signal response being display of the locator message. Additional registers include sequence registers 222A and 222B, which control the sequence and timing of the information displayed and an active sequence register 224, which selects one of the sequence registers 222A or 222B to be active at any particular time.

The sequence registers 222A and 222B store data register identifiers, with a display time value associated with each data register identifier. The register 222A stores a time value directing that the contents of the register 210A be displayed continuously while the contents of the register 210B are not displayed, and the register 212B stores a time value directing that the contents of the register 220B be displayed continuously while the contents of the register 210A are not displayed. Here, the register 210A stores values indicating that the first data register, that is, the register 210A, is to be displayed for 255 time units per cycle, while the second data register, 210B, is to be displayed for 0 time units per cycle. The active sequence register 224 stores a value designating either the register 222A or the register 222B as the active sequence register. Here, the active sequence register 224 stores a value designating the second sequence register, that is, the sequence register 222B, as active. The data stored in the sequence register that is designated the active sequence register controls the timing and sequencing of the information displayed by display 202 of the label 200. The contents of the registers may be received and stored as a result of messages prepared by a server such as the server 106 and transmitted by a communication base station such as the communication base station 104. In the present example, the selection of the register 222B as active causes a continuous display of the serial number of the label, S/N 4321245, which is shown on the display 202.

Only two data registers, two sequence registers and one active sequence register are shown in FIG. 2 for simplicity of illustration, but it will be recognized that a label such as the label 200 may include numerous data and sequence registers and a number of active sequence registers, as well as additional types of registers such as scheduled sequence registers that select an active sequence register according to a predetermined schedule.

The label 200 may be directed to display the locator message stored in the register 220B simply by a command addressed to the label to select the register 222B as the active sequence register. Such a command may be issued, for example, by a locator such as the locator 108 of FIG. 1. A label having the configuration of the label 200 can be directed to display the locator message in a relatively simple way, without the locator 108 issuing the actual locator message for storage and display. Instead, the locator 108 simply directs the display of a previously loaded message.

It will be recognized, however, that a label such as the label 200 need not be configured as described above. If desired, the label 200 may be configured so that the registers 220B and 222B are empty, or store data different from that described above. A locator may transmit a locator message to the label 200 and direct that the message be stored in the register 220A. Alternatively, the locator may transmit a locator message and direct that the message be stored in an empty register. The locator may then cause a sequence to be loaded into an empty sequence register so that the contents of the sequence register direct display of the locator message. The locator then issues a command to select the sequence register storing the loaded sequence as the active sequence register. Numerous alternative configurations of labels can be suitably employed, with the locator designed or programmed to operate with a label in a particular configuration so as to cause display of a locator message by the label.

In addition or as an alternative to display of the locator message, the label 200 may transmit a locator signal. The locator signal may be transmitted in response to a command transmitted by a CBS such as the CBS 104, or alternatively in response to a locator command transmitted by a locator such as the locator 108. The CBS 104 and the locator 108 transmit commands to the labels, with each label being addressed by serial number. Upon detecting a locator command addressed to the label 200, the processor 204 prepares a response, suitably including the label serial number, and passes the response to the communication interface 210 for transmission. As described in greater detail below in connection with FIG. 4, a locator signal transmitted by a label can be detected by a locator within range of the label.

Figure 3:
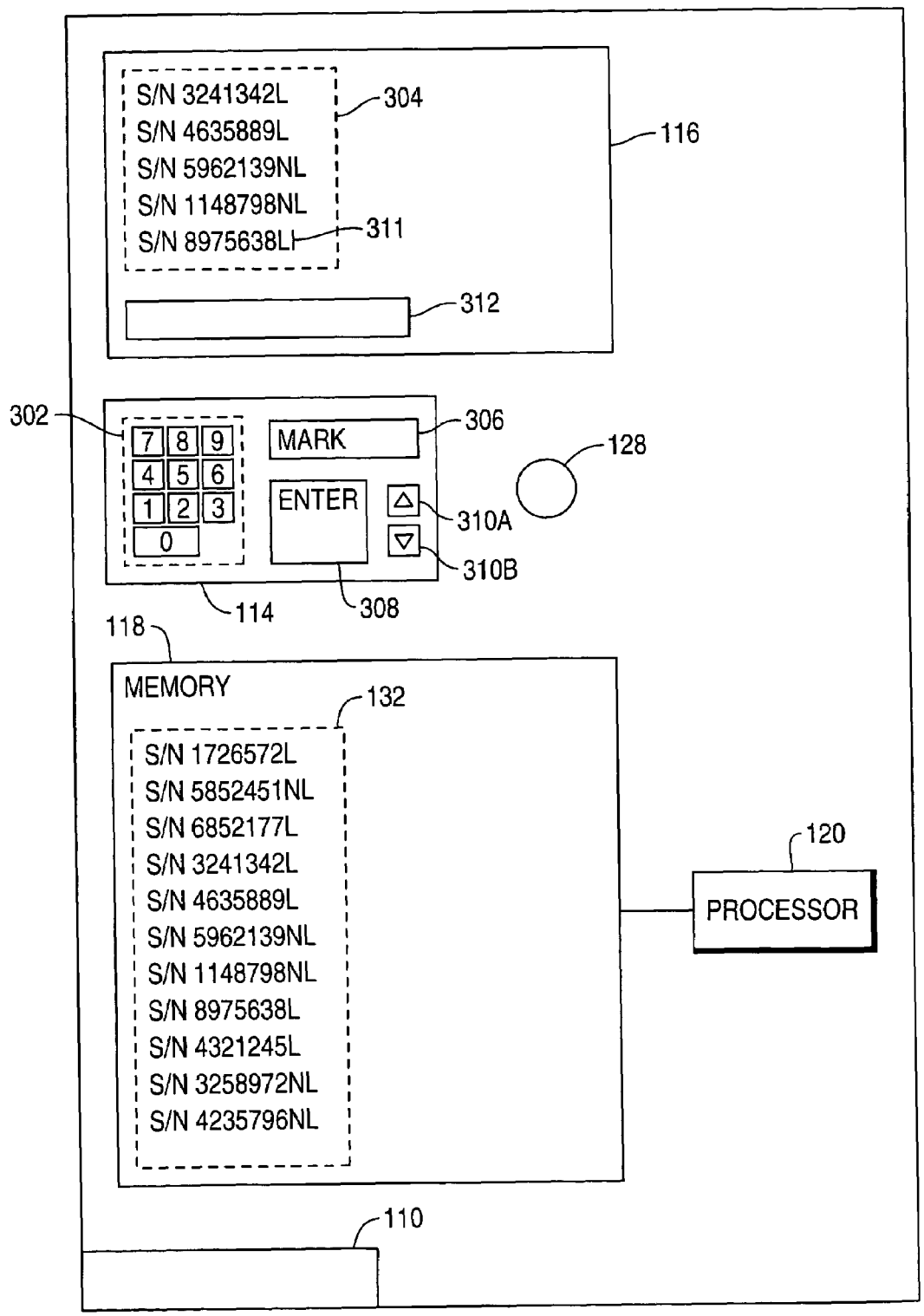
FIG. 3 illustrates an electronic shelf label locator according to an aspect of the present invention.

FIG. 3 illustrates additional details of the locator 108 of FIG. 1. The locator 108 includes the communication interface 110, the keypad 114, the display 116, the memory 118 and the processor 120. The memory 118 is shown here as containing a stored list 132 of serial numbers to be located, and the display 116 is shown as showing a displayed list 304 comprising the serial numbers making up the stored list 132. The displayed list 304 as illustrated here shows only a portion of the stored list 132, but a user may scroll up and down in the displayed list 304 to see any entry desired. The keypad 114 includes a number pad 302, a "mark" key 306 for marking serial numbers as found, an "enter" key 308 for submitting data entered using the number pad 114 and a pair of scroll keys 310A and 310B for moving a cursor 311 up and down in the list 304.

The locator 108 has been connected to the server 106, either directly or through an intermediary terminal or wireless connection, and has downloaded the list 132 of labels to be located. A portion of the list is shown on the display 114, and the scroll keys 310A and 310B can be used to scroll the list up and down so that any portion of the list can be displayed. Each serial number entry in the lists 132 and 304 suitably include "located" and "not located" indicators, L and NL, for example, depending on whether or not the user has indicated that a label has been found.

Once the list 302 has been loaded into the memory 118, a user carries the locator 108 around a location where labels are deployed. The processor 120 directs the transmission of appropriate commands to the labels identified on the list 132, for example a command to display a locator message, a command to transmit an identifier, or both. The communication interface 110 transmits the commands. If commands have been prepared for more than one label, the commands are transmitted in succession, with the communication interface 110 repeatedly cycling through the commands. The range of the communication interface is preferably relatively short, on the order of a few feet, so that only those labels within a reasonable visual range of a user will be affected.

As the user carries the locator 108 among the labels, the user looks for labels displaying a locator message. When a label is found, the user enters or selects the serial number using the keypad 114. The serial number associated with the label is identified as located in the list 132 stored in the memory 118, and identified as located in, or alternatively removed from, the list 304 shown in the display 116.

Additionally or alternatively, the locator 108 transmits a request for an identifying signal from labels whose serial numbers are stored in the list 132 and appear on the list 304, with each request including a serial number of a label as an address. A label transmits a response upon detecting a request addressed to it, with each response including the serial number of the responding label. When the locator 108 detects a response to a request, the label's serial number is highlighted in the list 304 shown on the display 116, or is shown in a "responding label" field 312, or both. When the user finds and identifies the indicated label and enters the serial number of the indicated label, a notation that the label has been located is associated with the label's serial number in the list 132. Such a notation may also be added in the list 304 shown in the display 116, or alternatively the serial number may be removed from the list.

Figure 4:
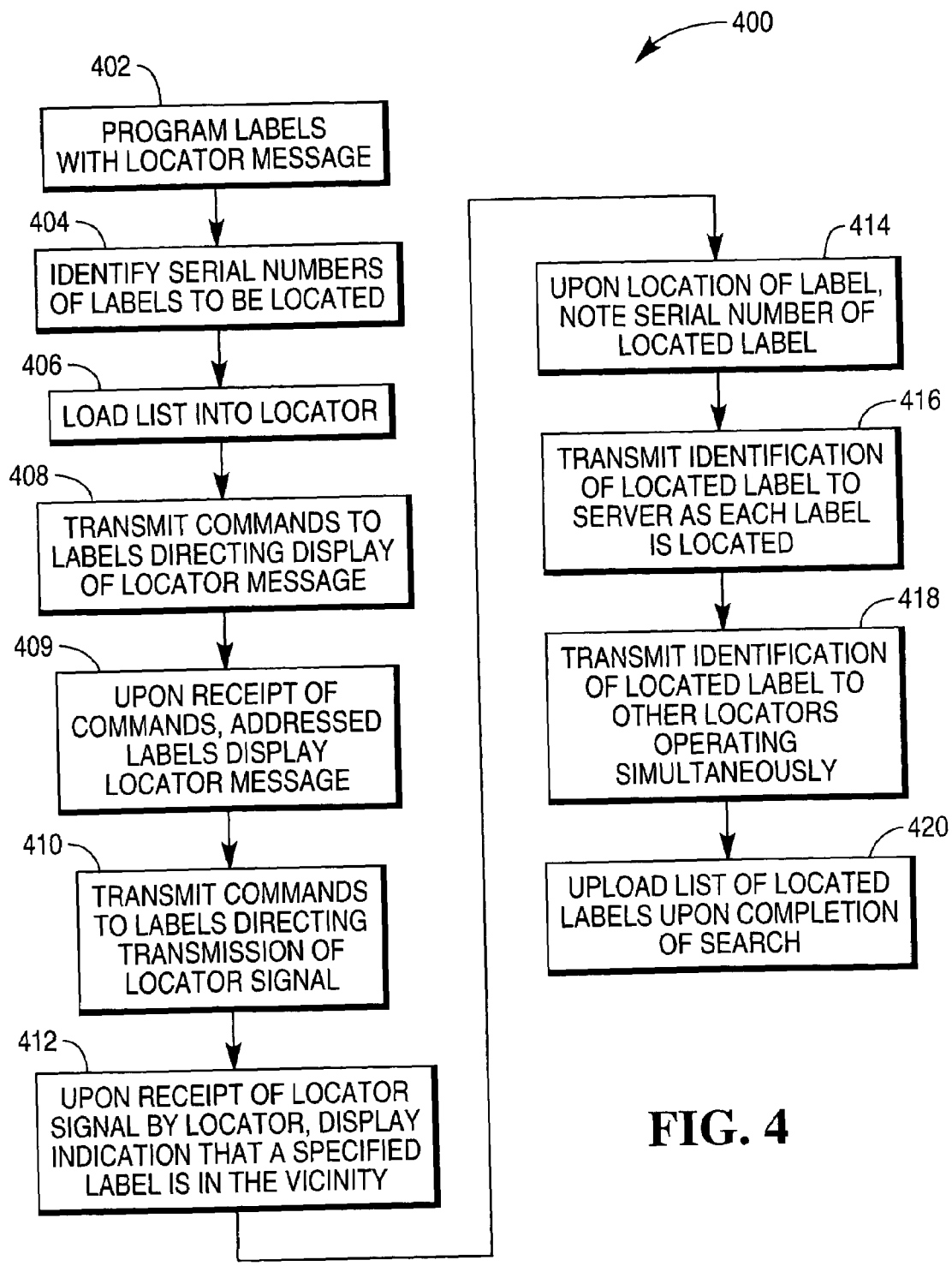
FIG. 4 illustrates a process for locating electronic shelf labels according to an aspect of the present invention.

FIG. 4 illustrates a process 400 of electronic shelf label location according to an aspect of the present invention. At step 402, each of a plurality of electronic shelf labels is programmed with a locator message, along with instructions causing the locator message to be displayed when the label receives appropriate commands. At step 404, a list of serial numbers of labels that need to be located is identified, for example, a list of labels identified in a bedcheck exceptions report or a status report. At step 406, the list of serial numbers of labels to be located is loaded into a locator. At step 408, the locator transmits commands addressed to the identified serial numbers directing display of the locator message. At step 409, each label receiving a command addressed to it displays an appropriate locator message.

At step 410, commands addressed to the identified serial numbers are transmitted, directing transmission of a locator signal by the labels. The commands may be generally broadcast, for example, by one or more communication base stations, or may be broadcast by a locator such as the locator 108. At step 412, when the locator receives a locator signal, the locator indicates that a specified label is in the vicinity. The locator may, for example, display an icon, sound a tone, display the serial number of the identified label, perform some combination of these actions, or the like. Steps 410 and 412 may be performed as an alternative or in addition to steps 408 and 409.

At step 414, upon identification of a located label, the serial number of the label is noted as located in memory of the locator and removed from a displayed list of labels to be located, or optionally noted as located in the displayed list. At step 416, identification of the located label is transmitted to a central server. At step 418, identification of the located label is transmitted from the central server to additional locators operating simultaneously. Alternatively or in addition to steps 416 and 418, at step 420 a list of all located labels is uploaded to a central server upon completion of a search.

While the present invention is disclosed in the context of a presently preferred embodiment, it will be recognized that a wide variety of implementations may be employed by persons of ordinary skill in the art consistent with the above discussion and the claims which follow below.

I claim:

1. An electronic shelf label, comprising:
   a memory for storing one or more of a plurality of available messages to be displayed or actions to be taken by the label, one of the available actions including providing a locator signal response indicator upon detection of a locator signal addressed to the label; and
   a processor for directing the actions to be taken by the label, the processor being operative to select providing of the locator signal response indicator as a current action to be taken upon detecting that the locator signal has been received where the locator signal response indicator includes displaying a locator message.

2. The electronic shelf label of claim 1, wherein the memory includes a plurality of data registers storing actions to be taken and messages to be displayed by the label, one or more of the actions and messages including locator signal response actions and wherein the processor directs selection of a stored locator signal response action for execution upon detection that a locator signal has been received.

3. The electronic shelf label of claim 2, wherein the memory further includes a plurality of sequence registers storing time sequences for use of data stored in the data registers, wherein one or more sequence registers is a locator signal response sequence register storing a time sequence directing selection of a locator signal response action for execution and wherein the processor selects an appropriate locator signal response sequence register as an active sequence register upon detection of a locator signal addressed to the register.

4. The electronic shelf label of claim 3, wherein the locator message includes an identifier associated with the label.

5. The electronic shelf label of claim 3, wherein one available locator signal response is transmission of a wireless signal indicating that the locator signal has been received.

6. The electronic shelf label of claim 5, wherein the wireless signal transmitted by the label includes an identifier associated with the label receiving the signal.

7. A handheld locator for locating electronic shelf labels, the locator comprising:
   memory for storing one or more identifiers for electronic shelf labels to be located;
   a processor for directing transmission of a locator signal addressed to a label and directing the label to provide a locator signal response where the locator signal response includes displaying on the label distinctive characteristics; and
   a communication interface for transmitting the locator signal to a label.

8. The locator of claim 7, wherein the communication interface is operative to wirelessly broadcast the locator signal.

9. The locator of claim 8, wherein the communication interface has a relatively short broadcast range.

10. The locator of claim 9, further comprising a user interface allowing user entry of one or more identifiers for labels to be located and wherein the processor is operative to direct sequential transmission of locator signals addressed to labels specified by the identifiers.

11. The locator of claim 10, wherein the user interface comprises a display showing identifiers for labels to be located and a user entry device allowing a user to indicate that an identified label has been located.

12. The locator of claim 11, further comprising a control center interface allowing the locator to receive from a remote control center one or more identifiers of labels to be located and to provide a notification to the control center when an identified label has been located.

13. The locator of claim 12, wherein the locator signal includes a command for a label to transmit an identifying signal.

14. The locator of claim 7, where the distinctive characteristics includes displaying a unique identifier associated with the label.

15. The locator of claim 7, where the distinctive characteristics includes displaying a blinking icon.

16. The locator of claim 7, where the locator signal response includes the label emitting a sound.

17. A method of locating electronic shelf labels, comprising:
   programming one or more labels with a locator signal response to be provided when a locator signal has been received wherein the programming includes programming the labels with a message to be displayed upon receipt a locator signal; and
   broadcasting a wireless locator signal addressed to a label to be identified.

18. The method of claim 15, wherein the message includes an identifier associated with the label.

19. The method of claim 18, wherein programming the one or more labels includes programming the labels to transmit a wireless locator response signal indicating that a locator signal has been received.

20. The method of claim 19, wherein the wireless signal includes an identifier associated with the label.

21. The method of claim 20, further comprising the step of displaying an appropriate message when a wireless locator response signal is received.

* * * * *